United States Patent
Balkos et al.

(10) Patent No.: US 6,997,697 B2
(45) Date of Patent: Feb. 14, 2006

(54) PRESS FOR MAKING PATTIES AND METHOD OF OPERATION

(76) Inventors: Loukritia Balkos, 7 Baroness Crescent, Toronto, Ontario (CA), M2J 3K4; Nikolas G. Balkos, 7 Baroness Crescent, Toronto, Ontario (CA), M2J 3K4; Konstantine G. Balkos, 7 Baroness Crescent, Toronto, Ontario (CA), M2J 3K4; Elena Balkos, 7 Baroness Crescent, Toronto, Ontario (CA), M2J 3K4

( * ) Notice: Subject to any disclaimer, the term of this patent is extended or adjusted under 35 U.S.C. 154(b) by 32 days.

(21) Appl. No.: 09/769,057

(22) Filed: Jan. 25, 2001

(65) Prior Publication Data

US 2001/0031302 A1 Oct. 18, 2001

Related U.S. Application Data

(60) Provisional application No. 60/178,326, filed on Jan. 27, 2000.

(51) Int. Cl.
*A22C 7/00* (2006.01)

(52) U.S. Cl. .................. 425/298; 425/318; 425/410; 425/443; 426/513; 99/439

(58) Field of Classification Search ............. 425/248, 425/318, 410; 426/513; 99/439; D7/162; 428/443, 470
See application file for complete search history.

(56) References Cited

U.S. PATENT DOCUMENTS

| | | | | | |
|---|---|---|---|---|---|
| 996,449 | A | * | 6/1911 | Bodenstein | 425/318 |
| 1,749,178 | A | * | 3/1930 | Berg | 425/318 |
| 2,837,761 | A | * | 6/1958 | Stiegler | 249/158 |
| 3,120,678 | A | * | 2/1964 | Glenny | 100/266 |
| 3,863,020 | A | | 1/1975 | Robinson | |
| 3,909,881 | A | | 10/1975 | Anderson | |
| 3,934,308 | A | | 1/1976 | Neri | |
| 3,943,602 | A | | 3/1976 | Siclari | |
| 4,106,162 | A | | 8/1978 | Fournier | |
| 4,180,889 | A | | 1/1980 | Joffe | |
| 4,765,029 | A | * | 8/1988 | Rogan | 425/298 |
| 5,112,634 | A | | 5/1992 | Swearingen | |
| 5,658,608 | A | * | 8/1997 | Klefbeck | 100/289 |

* cited by examiner

Primary Examiner—Donald Heckenberg
(74) Attorney, Agent, or Firm—Connolly Bove Lodge & Hutz LLP

(57) ABSTRACT

A press for making a patty includes a substantially flat panel to contact the product to be pressed into a patty. An upstanding member is affixed to the panel. A weight member or "mould" surrounds the upstanding member. The weight member is moveable along the upstanding member between a first position where the weight member overlies the panel to facilitate the application of force to the product and a second position where the weight member is spaced from the panel.

22 Claims, 3 Drawing Sheets

PRESS FOR MAKING PATTIES AND METHOD OF OPERATION

CROSS-RELATED APPLICATION

The present application claims the benefit of U.S. Provisional Patent Application Ser. No. 60/178,326 filed on Jan. 27, 2000.

FIELD OF THE INVENTION

The present invention relates generally to cooking utensils and in particular to a press for making patties, and to a method of forming patties from food product such as hamburger patties.

BACKGROUND OF THE INVENTION

One of the problems associated with prior art food presses has been the non-uniformity of the final pressed product. Uniformity is important not only in connection with the quantity of food material to be incorporated into the patty, but also in relation to its shape and appearance.

Many food presses for forming patties have been considered. For example, U.S. Pat. No. 4,180,889 to Joffe discloses a mould for forming hamburger patties having an integral plastic flat top and sidewalls defining a cavity. The walls are notched at opposed locations, and the top has a U-shaped slot with its ends on a line between the points. The top is of reduced thickness between the slot ends and notches to form hinges. Unfortunately, this design suffers from the inability to form patties of uniform size, and is without the capacity to remove excess meat during patty formation.

U.S. Pat. No. 5,112,634 to Swearingen discloses a mould for forming ground meat into patties. The mould has a hollow, cylindrical collar, which may be placed on a surface, and a centre plug with a first end fitting closely into the collar. The first end is concave and has a plurality of outwardly extending dimples. The plug is inserted into the collar and pressed. Similar to the Joffe mould, this design also suffers from an inability to form patties of uniform size, and is without the capacity to remove excess meat during patty formation.

U.S. Pat. No. 4,106,162 to Fournier discloses a mould for forming patties comprising an annular flat lower disc and an upper annular disc. The upper disc is of a smaller diameter than the lower disc and has a depending wall. A hollow member extends from the centre of one disc while a complementary telescoping solid element extends from the centre of the other disc. When the two elements are in engagement, the discs are guided toward each other by the co-operating elements to form a patty with a central opening. Generally, the buying public objects to burger patties with missing portions and as a result this mould suffers disadvantages.

U.S. Pat. No. 3,943,602 to Siclari discloses a patty-making apparatus comprising an upper chamber for holding a food mix, and a lower chamber for holding stacked patty moulds. The chambers are separated by a partition having an opening therein so that food mix can pass from the upper chamber and into patty moulds in the lower chamber. The lower chamber is closed at the bottom in a resilient manner. Aside from being complex and thus expensive, the Siclari apparatus does not produce satisfactory uniformity in the patties, because their size depends on the amount of food mix dispensed from the upper chamber into the lower chamber each time.

U.S. Pat. No. 3,934,308 to Neri discloses a patty moulding device including a stationary horizontal base plate and a mould with a through opening providing a mould cavity to accommodate material to be moulded. The mould is moveably mounted with respect to the base plate and is resiliently urged away from the base plate. A core element is detachably secured to the base plate within the mould cavity. The mould is moveable between a first position where the core element is disposed in the bottom of the mould, and a second position where the core element is disposed in a higher position within the mould cavity. Co-operating retaining devices hold the mould and core element in the first position when the mould is not in use. Unfortunately, this design is such that, when the mould is moved to form a patty, there is no place for excess meat to go, if any, resulting in non-uniform patties.

U.S. Pat. No. 3,909,881 to Anderson discloses a two-part cylindrical mould for manufacturing a hollow hamburger. Means are provided for forming a pocket in the meat. The process involves dispensing a metal foil insert into the hamburger to serve as a lining for the pocket. The lining remains in the hamburger during cooking.

U.S. Pat. No. 3,863,020 to Robinson discloses a method of forming a meat patty by pressing a predetermined quantity of minced meat into a mould, which imparts to the patty a series of concentric circular ribs separated by narrow circular grooves. This method suffers disadvantages in that because of the grooves, the patties lack uniformity. In addition, the method involves using plastic to remove the burger from the mould. Additionally, excess meat cannot be removed from the mould.

As will be appreciated, the prior art moulds discussed above do not provide for the formation of uniform patties from food product. It is therefore an object of the present invention to provide a novel press for making patties and method of making patties from food product.

SUMMARY OF THE INVENTION

Accordingly, in one aspect of the present invention there is provided a press for making a patty, comprising:

a mould having an opening therethrough; and a carrying component having a substantially flat panel and a handle affixed to said panel, said flat panel having a surface to contact a product to be pressed into a patty, said handle being sized to pass through said opening to allow said mould to move along said handle, said mould being positionable to overlie said panel and thereby facilitate the application of pressure to said product.

Preferably, the mould is significantly heavier than the flat panel and acts as a weight to facilitate the application of pressure to the product. It is also preferred that the mould is in the form of a disc having top and bottom generally circular surfaces bridged by a smooth, peripheral sidewall. The flat panel corresponds generally in shape and size to the bottom surface of the disc. The opening in the disc is positioned at the centre of the disc and the handle is centrally affixed to the flat panel. Preferably, the mould and carrying component are formed of stainless steel.

In one embodiment, the disc can be removed from the handle while in a second embodiment, the disc, although moveable along the handle, is retained on the handle.

According to another aspect of the present invention there is provided a press for making a food patty comprising:

a substantially flat panel having a generally planar, circular surface to contact food product to be pressed into a patty;

an upstanding member affixed to said panel; and a weight member surrounding said upstanding member, said weight member being moveable along said upstanding member between a first position where said weight member overlies said panel to facilitate the application of force to said food product and a second position where said weight member is spaced from said panel.

According to another aspect of the present invention there is provided a method of forming a patty from food product using a food press, said food press including a carrying component having a flat panel to contact said food product and a handle affixed to said flat panel to allow said flat panel to be positioned relative to said food product, and a mould moveable along said handle, said method comprising the steps of:

placing food product on a surface;

positioning the flat panel on said food product with said mould overlying the flat panel;

applying pressure to said food press to flatten said food product and form a patty of desired thickness;

removing excess food product extending beyond the periphery of said flat panel and mould;

moving the mould along said handle away from said flat panel; and separating said flat panel from said patty.

As will be appreciated, the food press in accordance with the present invention allows uniform patties to be made one at a time in a convenient and easy manner while avoiding sticking between the food press and the formed patties.

BRIEF DESCRIPTION OF THE DRAWINGS

Embodiments of the present invention will now be described more fully with reference to the accompanying drawings, in which like numerals denote like parts through the several views, and in which.

DETAILED DESCRIPTION OF THE PREFERRED EMBODIMENTS

Figure 1:
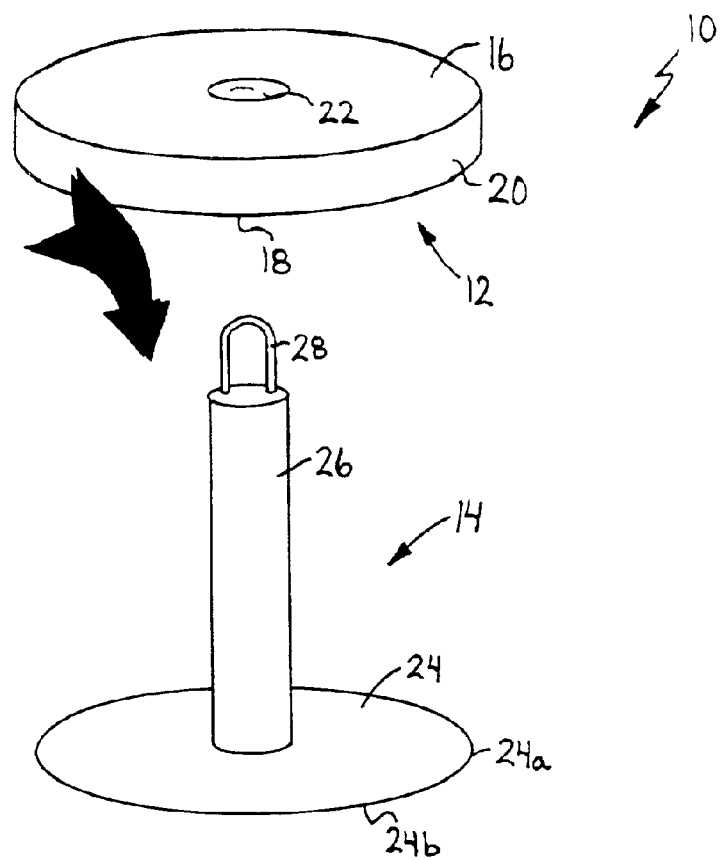
FIG. 1 is an exploded perspective view of a food press in accordance with the present invention.
Figure 2:
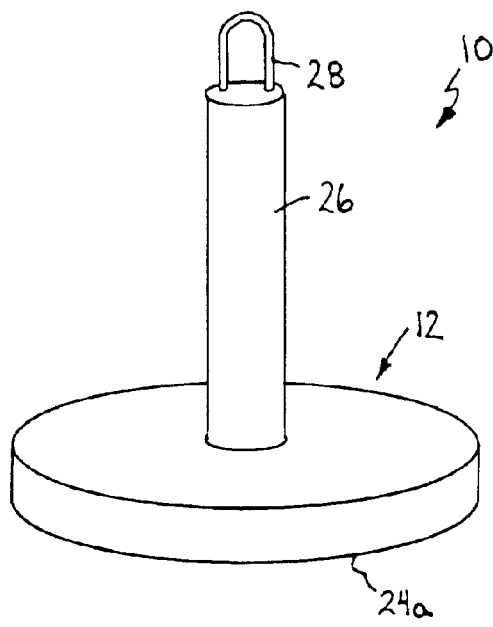
FIG. 2 is a perspective view of the food press shown in FIG. 1, but with its components in an assembled condition.

Attention is first directed to FIGS. 1 and 2, which show a food press 10 for making a food patty in accordance with the present invention. As can be seen, the food press 10 includes two primary components, namely a mould 12 and a carrying component 14. Preferably, the mould 12 and carrying component 14 are formed of stainless steel.

In this embodiment, the mould 12 is in the form of a relatively heavy disc having substantially flat, circular top and bottom walls 16 and 18, bridged by a smooth peripheral sidewall 20. The mould 12 has a diameter of about 12 cm and a thickness of about 1.5 cm. The diameter of the mould corresponds generally to the ultimate diameter of the food patty to be formed. A central hole 22 is provided through the mould 12.

The carrying component 14 includes a substantially flat, thin circular panel 24 having a diameter slightly smaller than the diameter of the mould 12. In this manner, the bottom edge of the mould 12 remains accessible when the mould 12 overlies the panel 24. The panel 24 is generally rigid and defines a lower surface 24b to contact food product that is to be pressed into patties. The carrying component 14 further includes an upright handle 26, which is centrally affixed to the flat panel 24 by a weld. The handle 26 is elongate and is in the form of a solid cylinder. A loop 28 is welded to the upper end of the handle 26 to allow the food press 10 to be hung from a hook for easy storage.

The handle 26 is sized and shaped such that it is adapted to pass easily through the hole 22 in the mould 12. This allows the mould 12 to be placed on the flat panel 24 and act as a weight when the press 10 is manipulated to form a patty yet be easily moved along the handle 26 away from the flat panel 24 after a patty has been formed.

Attention is now directed to FIGS. 3 to 7 for an explanation of the operation of the food press 10. During use, a ball 30 of food product such as ground meat or other food product is placed on a flat surface. Typically enough food product is utilized to provide slightly more than the desired amount of food product that is to form the final patty, thus ensuring that there will be excess food product.

Figure 3:
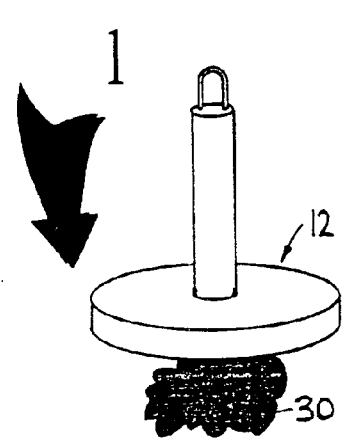
FIGS. 3 to 7 are sequential perspective views showing the operation of the food press and the method by which a patty is formed.
Figure 4:
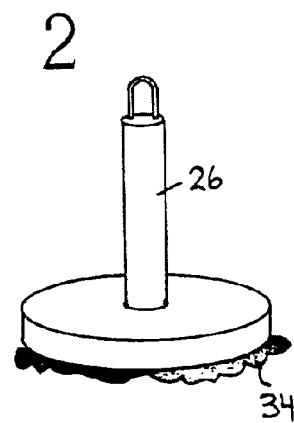
Figure 5:
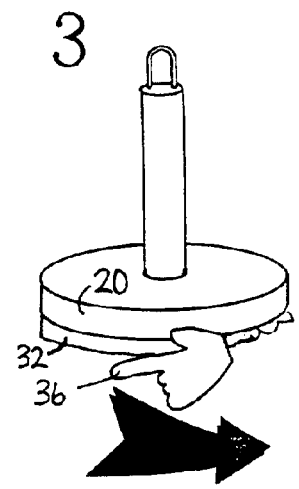

At this stage with the mould 12 overlying the flat panel 24, the food press 10 is positioned to place the flat panel 24 over the ball 30 of food product, and sufficient pressure is applied to the ball 30 by pushing down on the mould 12 thereby to flatten the ball into a patty 32 having the desired thickness as shown in FIGS. 3 and 4. The weight of the mould 12 facilitates this action. Since the ball 30 of food product typically utilizes more food product than is necessary to form the patty of desired thickness, excess food product 34 is ejected from beneath the flat panel 24 and extends beyond the peripheral sidewall 20 of the mould 12. The excess food product 34 is easily removed or stripped away from the patty 32 by running a finger 36 along the peripheral sidewall 20 as shown in FIG. 5.

Figure 6:
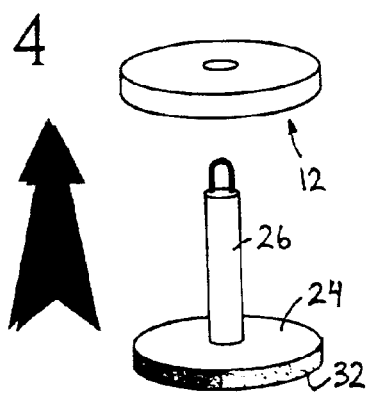
Figure 7:
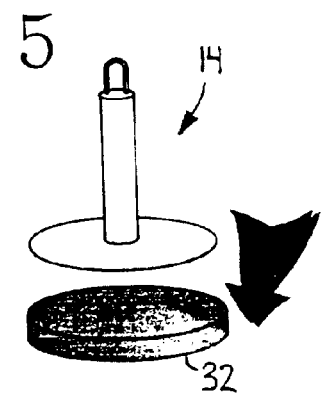

With the patty 32 formed and the excess food product 34 removed, the mould 12 is lifted upwardly along the handle 26 and away from the flat panel 24 while maintaining the flat panel on the patty 32 as shown in FIG. 6. Once the mould 12 has been separated from the flat panel 24, the flat panel 24 is removed from the patty 32 by lifting the carrying component 14 away from the patty using the handle 26 as shown in FIG. 7. Since the weight of the mould 12 is removed from the patty 32 before the flat panel 24 is separated from the patty, the flat panel 24 does not stick to the patty allowing the carrying component 14 to be easily removed from the patty.

Utilizing the present food press 10 in the above described manner produces a patty which is smooth, fully formed and ready for cooking or freezing. The patty forming process is easily reproduced allowing uniform patties to be formed one at the time.

When it becomes necessary to clean the food press 10, the mould 12 and carrying component 14 are separated in order to provide ready access to all portions of the food press that contact food.

Figure 8:
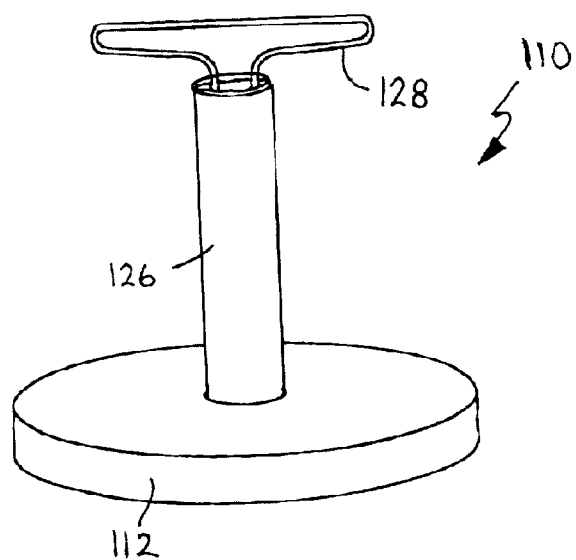
FIG. 8 is a perspective view of an alternative embodiment of a food press in accordance with the present invention.
Figures 9A, 9B:
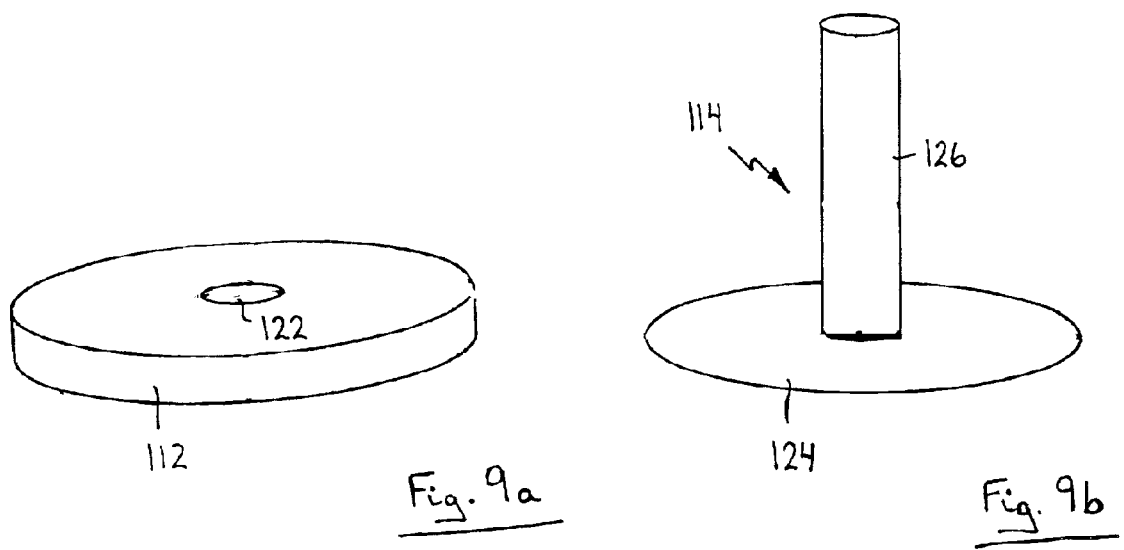
FIG. 9a is a perspective view of a mould forming part of the food press of FIG. 8.
FIG. 9b is a perspective view of a carrying component forming part of the food press of FIG. 8.

Turning now to FIGS. 8, 9a and 9b, an alternative embodiment of a food press in accordance with the present invention is shown and is generally identified by reference numeral 110. In this embodiment like reference numerals will be used to indicate like components with a "100" added for clarity. The food press 110 is very similar to that of the previous embodiment and includes a mould 112 and a carrying component 114 both of which are formed of stainless steel. The carrying component 114 includes a flat panel 124 and an upright handle 126 centrally affixed to the flat panel 124 by a mould. The upright handle 126 in this embodiment is in the form of a hollow cylinder. The handle 126 passes through an opening 122 in the mould 112 and is sized to permit the mould 112 to move along the handle 126. An elongate loop 128 is affixed to the open distal end of the handle 126 by a weld and acts as a retainer to inhibit the mould 112 from being removed from the handle.

The food press 110 is used in the same manner as that of the previous embodiment. The mould 112 however, cannot be removed from the handle due to the loop 128. The mould 112 can however be lifted from the panel 124 toward the loop 128 after a patty has been formed to facilitate separation between the panel 124 and the patty.

Although the mould has been shown as a disc, it will be appreciated that the mould can take other shapes such as a square, hexagon etc. if desired. Also, if desired, the opening in the mould can extend to the peripheral sidewall allowing the mould to be separated from the carrying component by moving the mould laterally away from the handle. In this case, when excess food product is being removed from a formed patty, the mould can be rotated to provide a smooth, finger running peripheral surface.

While preferred embodiments of the present invention have been illustrated in the accompanying drawings and described hereinabove, it will be evident to those skilled in the art that variations and modifications may be made without departing from the spirit and scope of this invention as defined by the appended claims.

We claim:

1. A press for making a food patty, comprising:
   a disc defining a weight, said disc having an opening therethrough and an outer exposed generally smooth peripheral sidewall; and
   a carrying component having a substantially flat panel and a handle affixed to said flat panel, said flat panel having a generally planar surface to contact food product to be pressed into a patty, said handle being sized to pass through said opening to allow said disc to move along said handle, said disc being moveable along said handle and positionable to overlie said flat panel thereby to facilitate the application of pressure to said food product, said peripheral sidewall defining a running surface over which an object can be run to remove food product extending therebeyond during formation of a food patty, wherein said disc has top and bottom generally circular surfaces bridged by said sidewall and wherein said flat panel corresponds generally in shape to said bottom surface.

2. A press according to claim 1 wherein said opening is positioned at the centre of said disc and wherein said handle is centrally affixed to a surface of said flat panel opposite to said generally planar surface.

3. A press according to claim 1 wherein said disc and carrying component are formed of stainless steel.

4. A press according to claim 3 further including a loop affixed to a free distal end of said handle.

5. A press according to claim 1 wherein said disc has a diameter greater than the diameter of said panel.

6. A press for making a food patty comprising:
   a substantially flat panel having a generally planar, circular surface to contact food product to be pressed into a patty;
   an upstanding member affixed to said panel; and
   a weighted disc surrounding said upstanding member and having a generally smooth peripheral sidewall over which a finger can be rim to remove food product extending beyond the peripheral sidewall during patty formation, said disc being moveable along said upstanding member between a first position where said disc overlies said panel to facilitate the application of force to said food product and a second position where said disc is spaced from said panel, wherein said disc has top and bottom generally circular surfaces bridged by said smooth, peripheral sidewall and wherein said flat panel corresponds generally in shape to said bottom surface.

7. A press according to claim 6 wherein said opening is positioned at the centre of said disc and wherein said upstanding member is centrally affixed to said flat panel.

8. A press according to claim 7 wherein said disc, upstanding member and flat panel are formed of stainless steel.

9. A press according to claim 8 further including a loop affixed to a free distal end of said upstanding member.

10. A press according to claim 9 wherein said loop is elongate and acts as a retainer to inhibit said disc from being removed from said upstanding member.

11. A press according to claim 6 wherein said disc has a diameter greater than the diameter of said flat panel.

12. A press according to claim 1 wherein said disc is rotatable about said handle.

13. A press according to claim 12 wherein said opening is positioned at the centre of said disc and wherein said handle is centrally affixed to a surface of said flat panel opposite to said generally planar surface.

14. A press according to claim 6 wherein said disc is rotatable about said upstanding member.

15. A press according to claim 14 wherein said opening is positioned at the centre of said disc and wherein said upstanding member is centrally affixed to said flat panel.

16. A press for making a food patty, comprising:
    a weight member having an opening therethrough; and
    a carrying component having a substantially flat panel and a handle affixed to said flat panel, said flat panel having a generally planar surface to contact a food product to be pressed into a patty, said handle being sized to pass through said opening to allow said weight member to move along said handle, said weight member being positionable to overlie said flat panel thereby to facilitate the application of pressure to said food product, wherein said weight member is a disc having top and bottom generally circular surfaces bridged by a smooth, peripheral sidewall and wherein said flat panel corresponds generally in shape to said bottom surface.

17. A press according to claim 16 wherein said disc has a diameter greater than the diameter of said flat panel.

18. A press according to claim 17 wherein said opening is positioned at the centre of said disc and wherein said handle is centrally affixed to said flat panel.

19. A press according to claim 18 wherein said weight member and carrying component are formed of stainless steel.

20. A press according to claim 18 further including a loop affixed to a free distal end of said handle.

21. A press according to claim 20 wherein said loop acts as a retainer to inhibit said weight member from being removed from said handle.

22. A press according to claim 16 wherein said disc is rotatable about said handle.

* * * * *